US012455342B2

(12) United States Patent
Sambhwani et al.

(10) Patent No.: US 12,455,342 B2
(45) Date of Patent: Oct. 28, 2025

(54) RADIO-FREQUENCY EXPOSURE BEAM MANAGEMENT AND SELECTION IN COMMUNICATIONS SYSTEMS

(71) Applicant: Apple Inc., Cupertino, CA (US)

(72) Inventors: Sharad Sambhwani, San Diego, CA (US); Dirk Nickisch, Oberpframmern (DE); Laxminarayana Pillutla, San Diego, CA (US); Mark G Forbes, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 17/903,420

(22) Filed: Sep. 6, 2022

(65) Prior Publication Data

US 2023/0083550 A1 Mar. 16, 2023

Related U.S. Application Data

(60) Provisional application No. 63/245,102, filed on Sep. 16, 2021.

(51) Int. Cl.
 *G01S 7/00* (2006.01)
 *G01S 13/89* (2006.01)

(52) U.S. Cl.
 CPC ............. *G01S 7/003* (2013.01); *G01S 13/89* (2013.01)

(58) Field of Classification Search
 CPC .... H04B 1/3838; H04B 17/102; H04B 1/401; H04B 7/0404; H04B 7/0608; H04B 7/0602; H04B 7/0691; H04B 7/0695; H04B 7/06956; H04B 7/082; H04B 17/318; H04B 7/088; H04B 17/101; H04B 17/0087; H04W 52/146; H04W 52/367; H04W 72/21; H04W 52/30; H04W 24/10; H04W 24/08; H04W 52/283; H04W 52/42;

(Continued)

(56) References Cited

U.S. PATENT DOCUMENTS 8,781,420 B2   7/2014  Schlub et al.
9,667,290 B2   5/2017  Ouyang et al.
10,587,299 B1* 3/2020  Sahoo ................... H01Q 1/245

(Continued)

FOREIGN PATENT DOCUMENTS

WO   2015142723 A1   9/2015
WO   2021149260 A1   7/2021

*Primary Examiner* — Olumide Ajibade Akonai
(74) *Attorney, Agent, or Firm* — Treyz Law Group, P.C.; Michael H. Lyons

(57) ABSTRACT

An electronic device may include a set of antenna panels (APs) that transmit and receive signals within a set of signal beams. A proximity sensor such as a radar sensor may gather sensor data indicative of the position an external object. The device may select an AP and a beam that maximize wireless performance in communicating with a base station while also complying with the radio-frequency exposure (RFE). The device may select the AP and the beam based on the sensor data, per-panel and per-beam projected RFE values, antenna port RFE characteristics, per-panel and per-beam transmit power limits, per-beam transmit power backoffs, an RFE lookup table, regulatory RFE limits, and antenna performance metrics. The device may transmit an RFE report to the base station that identifies some or all of this information for use in updating scheduling for the device.

20 Claims, 11 Drawing Sheets

(58) Field of Classification Search
CPC ...... H04W 13/04; H04W 16/28; H01Q 1/243; H01Q 1/245; G01S 13/89; G01S 7/003
See application file for complete search history.

(56) References Cited

U.S. PATENT DOCUMENTS

| | | | |
|---|---|---|---|
| 11,121,469 B2 | 9/2021 | Paulotto et al. | |
| 11,169,382 B2 | 11/2021 | Elaan et al. | |
| 12,184,320 B2 * | 12/2024 | Jaurigue | H04B 17/30 |
| 2019/0204435 A1 | 7/2019 | Poiger et al. | |
| 2019/0222326 A1 | 7/2019 | Dunworth et al. | |
| 2020/0374818 A1 | 11/2020 | Cai et al. | |
| 2020/0411960 A1 | 12/2020 | Ng et al. | |
| 2021/0055385 A1 | 2/2021 | Rimini et al. | |
| 2021/0083369 A1 | 3/2021 | Brobston et al. | |
| 2022/0166454 A1 * | 5/2022 | Jaurigue | H04B 17/30 |
| 2022/0255212 A1 | 8/2022 | Edwards et al. | |
| 2023/0083588 A1 | 3/2023 | Matsumura et al. | |

* cited by examiner

RADIO-FREQUENCY EXPOSURE BEAM MANAGEMENT AND SELECTION IN COMMUNICATIONS SYSTEMS This application claims the benefit of U.S. Provisional Patent Application No. 63/245,102, filed Sep. 16, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The antennas transmit radio-frequency signals. During transmission, the radio-frequency signals are sometimes incident upon nearby external objects such as the body of a user or another person.

Electronic devices with wireless capabilities are typically operated in geographic regions that impose regulatory limits on the amount of radio-frequency exposure produced by the electronic device in transmitting radio-frequency signals. It can be challenging to design electronic devices that meet these regulatory limits without sacrificing an excessive amount of radio-frequency performance.

SUMMARY

An electronic device may wirelessly communicate with a base station. The electronic device may include wireless circuitry and one or more processors. The wireless circuitry may include a set of antenna panels distributed across the electronic device. Each antenna panel in the set of antenna panels may transmit and receive radio-frequency signals within a corresponding set of signal beams. The electronic device may be subject to radio-frequency exposure (RFE) limits.

The electronic device may include a proximity sensor. The proximity sensor may gather sensor data indicative of the position of one or more objects external to the device. The proximity sensor may include a radar sensor that transmits and receives radar signals using the antenna panels and the signal beams. The one or more processors may select an antenna panel from the set of antenna panels and may select a signal beam from the set of signal beams that maximize wireless performance in communicating with the base station while also complying with the RFE limits despite the presence of the objects, which may move over time.

The device may generate per-panel projected RFE values based on the sensor data and antenna port RFE characteristics. The device may generate per-panel transmit (TX) power limits based on the RFE limits and the per-panel projected RFE values. The device may select the antenna panel based on the per-panel TX power limits and antenna performance metrics. The device may map the target objects to spatial zones based on the sensor data. The device may generate per-beam projected RFE values based on the spatial zones and a pre-calibrated RFE look-up table. The device may generate per-beam TX power limits and per-beam power backoffs based on the per-beam projected RFE values and the RFE limits. The device may select the beam based on the per-beam TX power limits, the per-beam power backoffs, and the antenna performance metrics.

The device may transmit a signal that includes an RFE report to the base station. The RFE report may be transmitted using uplink control information (UCI) or a media access control (MAC) control element (CE). The RFE report may include the per-panel projected RFE values, the per-panel TX power limits, the per-beam TX power limits, the per-beam projected RFE values, or other information. The base station may use the RFE report to update scheduling grants for the device.

An aspect of the disclosure provides an electronic device. The electronic device can include a set of antenna panels at different locations and configured to transmit and receive radar signals. The electronic device can include one or more processors. The one or more processors can be configured to identify a position of an object relative to the set of antenna panels based on the transmitted and received radar signals. The one or more processors can be configured to transmit wireless data over an antenna panel in the set of antenna panels that is selected based on the identified position of the object.

An aspect of the disclosure provides an electronic device. The electronic device can include antennas at different locations and configured to transmit and receive radar signals within a set of signal beams. The electronic device can include one or more processors. The one or more processors can be configured to identify a position of an object relative to the antennas based on the transmitted and received radar signals. The one or more processors can be configured to transmit wireless data over a signal beam in the set of signal beams that is selected based on the identified position of the object.

An aspect of the disclosure provides a method of operating an electronic device to communicate with a wireless base station. The method can include with a set of antenna panels, transmitting radio-frequency signals within a set of signal beams. The method can include with one or more processors, generating radio-frequency exposure (RFE) information based on the transmitted radio-frequency signals. The method can include with an antenna panel in the set of antenna panels, transmitting a report to the wireless base station using a signal beam of the set of signal beams, the report including the RFE information generated by the one or more processors.

DETAILED DESCRIPTION

Figure 1:
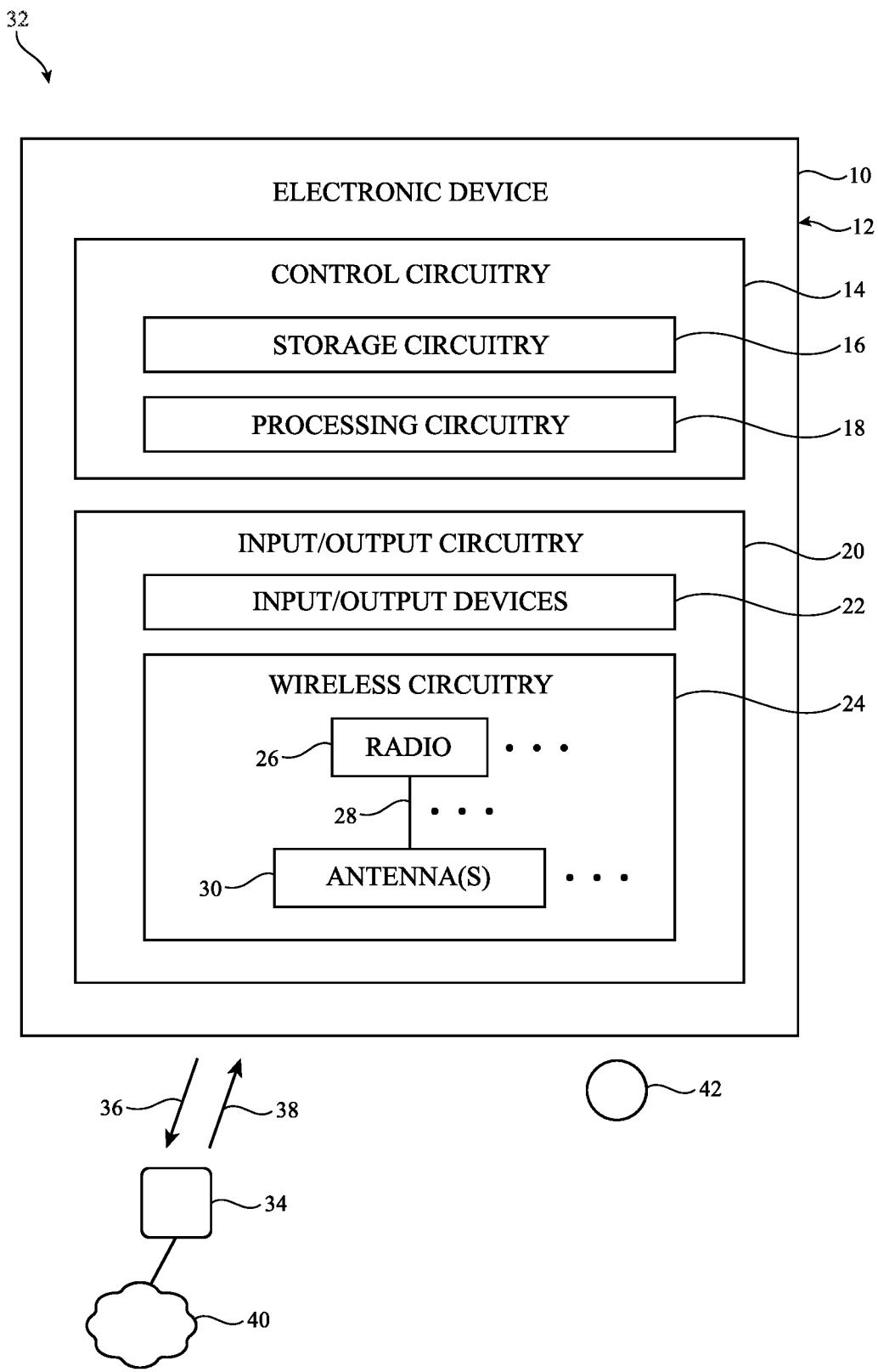
FIG. 1 is a block diagram of an illustrative electronic device having wireless circuitry with radios subject to radio-frequency exposure (RFE) limits in accordance with some embodiments.

FIG. 1 is a block diagram of an illustrative electronic device 10 that may be operated in a communications system such as communications system 32. Communications system 32 (sometimes referred to herein as communications network 32) may be used to convey wireless data between communications terminals. Communications system 32 may include network nodes (e.g., communications terminals). The network nodes may include user equipment (UE) such as one or more devices 10. The network nodes may also include external communications equipment (e.g., communications equipment other than device 10) such as external communications equipment 34. External communications equipment 34 may include a wireless base station, wireless access point, or other wireless equipment for example. Implementations in which external communications equipment 34 is a wireless base station that supports cellular telephone communications (e.g., voice and/or data signals) are described herein as an example. External communications equipment 34 may therefore sometimes be referred to herein as wireless base station 34, gNB 34, or simply as base station 34.

Device 10 and base station 34 may communicate with each other using wireless communications links. If desired, device 10 may wirelessly communicate with base station 34 without passing communications through any other intervening network nodes in communications system 32 (e.g., device 10 may communicate directly with base station 34 over-the-air). This may involve device 10 transmitting radio-frequency signals in an uplink (UL) direction 36 from device 10 to base station 34 and/or may involve base station 34 transmitting radio-frequency signals in a downlink (DL) direction 38 from base station 34 to device 10.

Communications system 32 may form a part of a larger communications network that includes network nodes (e.g., in network portion 40) coupled to base station 34 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. Device 10 may send data to and/or may receive data from other nodes or terminals in the larger communications network via base station 34 (e.g., base station 34 may serve as an interface between device 10 and the rest of the larger communications network).

Device 10 may be a user equipment (UE) device that is owned and/or operated by a user and that wirelessly communicates with external communications equipment such as base station 34. Base station 34 may be owned and/or operated by a network service provider or carrier. Device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

To support interactions with external communications equipment, control circuitry 14 may be used in implementing communications protocols. Communications protocols that may be implemented using control circuitry 12 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, image sensors, light sensors, radar sensors, lidar sensors, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. Sensors in input/output devices 22 may generate corresponding sensor data. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Antennas 30 may transmit radio-frequency signals (e.g., in UL direction 36) and/or may receive radio-frequency signals (e.g., in DL direction 38). Wireless circuitry 24 may also include one or more radios 26. Each radio 26 may include radio-frequency transceiver circuitry such as one or more radio-frequency transmitters and one or more radio-frequency receivers. The transmitter(s) may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 30. The receiver(s) may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 30. The components of radio 26 may be mounted onto a single substrate or integrated into a single integrated circuit, chip, package, or system-on-chip (SOC) or may be distributed between multiple substrates, integrated circuits, chips, packages, or SOCs. Each radio 26 may include baseband circuitry (e.g., one or more baseband processors) or, if desired, two or more radios 26 may share baseband circuitry (e.g., one or more baseband processors). Shared baseband circuitry may, if desired, be disposed on a different integrated circuit, chip, package, SOC, printed circuit, or logic board from radio(s) 26.

Antenna(s) 30 may be formed using any desired antenna structures for conveying radio-frequency signals. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given/selected beam pointing direction (e.g., towards external communications equipment).

The term "convey radio-frequency signals" as used herein means the transmission and/or reception of the radio-frequency signals (e.g., for performing unidirectional and/or bidirectional wireless communications with external wireless communications equipment). Similarly, the term "convey wireless data" as used herein means the transmission and/or reception of wireless data using radio-frequency signals. Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Each radio 26 may be coupled to one or more antennas 30 over one or more radio-frequency transmission lines 28. Radio-frequency transmission lines 28 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 28 may be integrated into rigid and/or flexible printed circuit boards if desired. One or more radio-frequency transmission lines 28 may be shared between multiple radios 26 if desired. Radio-frequency front end (RFFE) modules may be interposed on one or more radio-frequency transmission lines 28. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 28.

Each radio 26 may transmit and/or receive radio-frequency signals within corresponding frequency bands at radio frequencies (sometimes referred to herein as communications bands or simply as "bands"). The frequency bands handled by radio(s) 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands at sub-THz frequencies greater than 100 GHz, cellular sidebands, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest.

Radio(s) 26 may use antenna(s) 30 to transmit and/or receive radio-frequency signals to convey wireless communications data between device 10 and external equipment such as base station 34. Wireless communications data may be conveyed by radio(s) 26 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radio(s) 26 may additionally or alternatively use antenna(s) 30 to perform spatial ranging operations (e.g., for identifying a distance between device 10 and an external object such as external object 42). Radio(s) 26 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

When performing spatial ranging, radio(s) 26 may use one or more antennas 30 (e.g., transmit antenna(s)) to transmit radio-frequency signals (e.g., radar signals that include one or more signal tones, continuous waves of radio-frequency energy, wideband signals, chirp signals, or any other desired transmit signals for use in spatial ranging operations). These radio-frequency signals may sometimes be referred to herein as radar signals. The radar signals may, for example, be free from wireless communications data (e.g., cellular communications data packets, WLAN communications data packets, etc.).

The radar signals may reflect off of objects external to device 10 such as external object 42 as reflected radar signals. Scenarios in which external object 42 is the body or a body part (e.g., hand) of a human user are described herein as an example. More generally, external object 42 may include other external objects such as the ground, a building, part of a building, a wall, furniture, a ceiling, a person, a body part, an animal, a vehicle, a landscape or geographic feature, an obstacle, external communications equipment, another device of the same type as device 10 or a peripheral device such as a gaming controller or remote control, or any other physical object or entity that is external to device 10. Scenarios where external object 42 is a body part of a user may implicate radio-frequency exposure (RFE) limits, causing external object 42 to form a target object for analysis of RFE and compliance with the RFE limits. External object 42 may therefore sometimes be referred to herein as target object 42.

One or more antenna(s) 30 (e.g., receive antenna(s), which may be the same as or different from the transmit antenna(s)) may receive the reflected radar signals. The reflected radar signals may be a reflected version of the transmitted radar signals that have reflected off of target object 42 and back towards device 10. Control circuitry 14 may process the transmitted radar signals and the received reflected radar signals to detect or estimate the range (distance) between device 10 and target object 42. If desired, control circuitry 14 may also process the transmitted and received radar signals (e.g., from two or three different antennas 30) to identify a two or three-dimensional spatial location (position) of target object 42 (e.g., an angle-of-arrival of the reflected radar signals) and/or a velocity of target object 42. If desired, a loopback path may be coupled between the a transmit path and a receive path in wireless circuitry 24. As an example, in implementations where radio(s) 26 perform spatial ranging using an FMCW scheme, the loopback path may be a de-chirp path that conveys chirp signals on the transmit path to a de-chirp mixer on the receive path. In these implementations, doppler shifts in continuous wave transmit signals may be detected and processed to identify the velocity of target object 42, and the time dependent frequency difference between the radar signals and the reflected radar signals may be detected and processed to identify the range and/or the position of target object 42. Use of continuous wave signals for estimating range may allow control circuitry 14 to reliably distinguish between target object 42 and other background or slower-moving objects, for example. This example is merely illustrative and, in general, radio(s) 26 may implement any desired radar or spatial ranging scheme.

The example of FIG. 1 is illustrative and non-limiting. If desired, radio(s) 26 may detect (sense) the range and/or position of target object 42 using voltage standing wave ratio (VSWR) sensor(s) coupled to antenna(s) 30, using antenna(s) 30 as capacitive proximity sensors, using antenna(s) 30 under any other desired radio-frequency sensing scheme, and/or using any other sensors in input/output devices 22. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of radio(s) 26. The baseband circuitry may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer. If desired, the PHY layer operations may additionally or alternatively be performed by radio-frequency (RF) interface circuitry in wireless circuitry 24.

Figure 2:
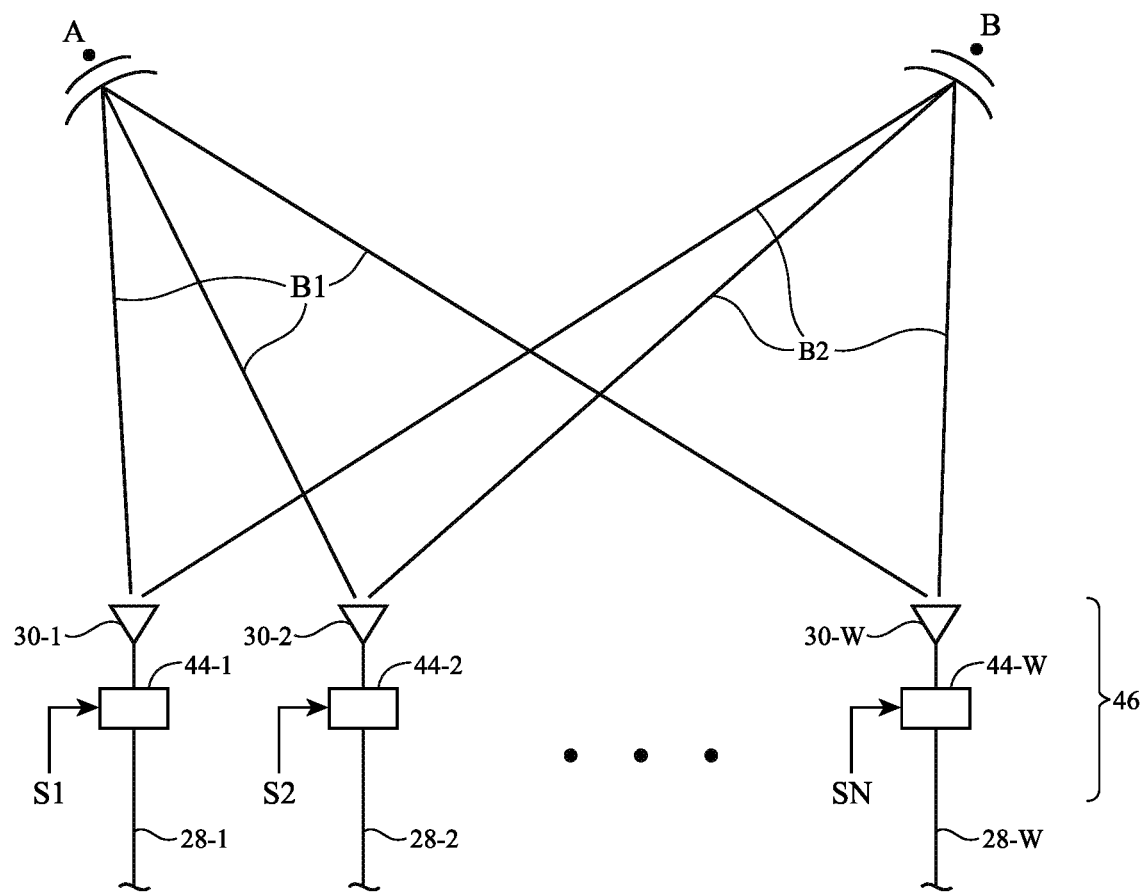
FIG. 2 is a diagram of an illustrative phased antenna array that may be adjusted to form beams of signals oriented in different directions in accordance with some embodiments.

Two or more antennas 30 may be arranged in one or more phased antenna arrays. FIG. 2 shows how antennas 30 may be formed in a corresponding phased antenna array 46. As shown in FIG. 2, phased antenna array 46 (sometimes referred to herein as array 46, antenna array 46, or array 46 of antennas 30) may be coupled to radio-frequency transmission lines 28. For example, a first antenna 30-1 in phased antenna array 46 may be coupled to a first radio-frequency transmission 28-1, a second antenna 30-2 in phased antenna array 46 may be coupled to a second radio-frequency transmission line 28-2, an Wth antenna 30-W in phased antenna array 46 may be coupled to a Wth radio-frequency transmission line 28-W, etc. While antennas 30 are described herein as forming a phased antenna array, the antennas 30 in phased antenna array 46 may sometimes also be referred to as collectively forming a single phased array antenna (e.g., where antennas 30 form antenna elements of the phased array antenna).

Antennas 30 in phased antenna array 46 may be arranged in any desired number of rows and columns or in any other desired pattern (e.g., the antennas need not be arranged in a grid pattern having rows and columns). Each antenna 30 may be separated from one or more adjacent antennas 30 in phased antenna array 46 by a predetermined distance such as approximately half an effective wavelength of operation of the array. During signal transmission operations, radio-frequency transmission lines 28 may be used to supply signals (e.g., radio-frequency signals such as millimeter wave and/or centimeter wave signals) from transceiver circuitry to phased antenna array 46 for wireless transmission. During signal reception operations, radio-frequency transmission lines 28 may be used to supply signals received at phased antenna array 46 (e.g., from external wireless equipment or transmitted signals that have been reflected off of external objects) to transceiver circuitry.

The use of multiple antennas 30 in phased antenna array 46 allows beam forming/steering arrangements to be implemented by controlling the relative phases and magnitudes (amplitudes) of the radio-frequency signals conveyed by the antennas. In the example of FIG. 2, antennas 30 each have a corresponding radio-frequency phase and magnitude controller 44 (e.g., a first phase and magnitude controller 44-1 interposed on radio-frequency transmission line 28-1 may control phase and magnitude for radio-frequency signals handled by antenna 30-1, a second phase and magnitude controller 44-2 interposed on radio-frequency transmission line 28-2 may control phase and magnitude for radio-frequency signals handled by antenna 30-2, an Wth phase and magnitude controller 44-W interposed on radio-frequency transmission line 28-W may control phase and magnitude for radio-frequency signals handled by antenna 30-W, etc.).

Phase and magnitude controllers 44 may each include circuitry for adjusting the phase of the radio-frequency signals on radio-frequency transmission lines 28 (e.g., phase shifter circuits) and/or circuitry for adjusting the magnitude of the radio-frequency signals on radio-frequency transmission lines 28 (e.g., power amplifier and/or low noise amplifier circuits). Phase and magnitude controllers 44 may sometimes be referred to collectively herein as beam steering circuitry or beam forming circuitry (e.g., beam steering/forming circuitry that steers/forms the beam of radio-frequency signals transmitted and/or received by phased antenna array 46).

Phase and magnitude controllers 44 may adjust the relative phases and/or magnitudes of the transmitted signals that are provided to each of the antennas in phased antenna array 46 and may adjust the relative phases and/or magnitudes of the received signals that are received by phased antenna array 46. Phase and magnitude controllers 44 may, if desired, include phase detection circuitry for detecting the phases of the received signals that are received by phased antenna array 46. The term "beam" or "signal beam" may be used herein to collectively refer to wireless signals that are transmitted and/or received by phased antenna array 46 in a particular direction. Each beam may exhibit a peak gain that is oriented in a respective beam pointing direction at a corresponding beam pointing angle (e.g., based on constructive and destructive interference from the combination of signals from each antenna in the phased antenna array). Different sets of phase and magnitude settings for phase and magnitude controllers 44 may configure phased antenna array 46 to form different beams in different beam pointing directions.

If, for example, phase and magnitude controllers 44 are adjusted to produce a first set of phases and/or magnitudes, the signals will form a beam as shown by beam B1 of FIG. 2 that is oriented in the direction of point A. If, however, phase and magnitude controllers 44 are adjusted to produce a second set of phases and/or magnitudes, the signals will form a beam as shown by beam B2 that is oriented in the direction of point B. Each phase and magnitude controller 44 may be controlled to produce a desired phase and/or magnitude based on a corresponding control signal S received from control circuitry 14 of FIG. 1 (e.g., the phase and/or magnitude provided by phase and magnitude controller 44-1 may be controlled using control signal S1, the phase and/or magnitude provided by phase and magnitude controller 44-2 may be controlled using control signal S2, the phase and/or magnitude provided by phase and magnitude controller 44-N may be controlled using control signal SN, etc.). If desired, the control circuitry may actively adjust control signals S in real time to steer (form) the beam in different desired directions over time. Phase and magnitude controllers 44 may provide information identifying the phase of received signals to control circuitry 14 if desired.

When performing wireless communications using radio-frequency signals at relatively high frequencies such as millimeter and centimeter wave frequencies, radio-frequency signals are conveyed over a line-of-sight path between phased antenna array 46 and external communications equipment. If the external equipment is located at point A of FIG. 2, phase and magnitude controllers 44 may be adjusted to steer the signal beam towards point A (e.g., to steer the pointing direction of the signal beam towards point A). Phased antenna array 46 may transmit and receive radio-frequency signals in the direction of point A. Similarly, if the external equipment is located at point B, phase and magnitude controllers 44 may be adjusted to steer the signal beam towards point B (e.g., to steer the pointing direction of the signal beam towards point B). Phased antenna array 46 may transmit and receive radio-frequency signals in the direction of point B.

In the example of FIG. 2, beam steering is shown as being performed over a single degree of freedom for the sake of simplicity (e.g., towards the left and right on the page of FIG. 2). However, in practice, the beam may be steered over two or more degrees of freedom (e.g., in three dimensions, into and out of the page and to the left and right on the page of FIG. 2). Phased antenna array 46 may have a corresponding field of view over which beam steering can be performed (e.g., in a hemisphere or a segment of a hemisphere over the phased antenna array).

If desired, device 10 may include multiple phased antenna arrays 46 that each face a different direction to provide coverage from multiple sides of the device. Each phased antenna array 46 may be formed as a part of a respective antenna panel (AP) within device 10. If desired, multiple phased antenna arrays 46 may be disposed on a single antenna panel and/or a single phased antenna array 46 may be distributed across two or more antenna panels. The antenna panels may be disposed at different locations on device 10 for providing a full sphere of beam coverage around device 10.

Figure 3:
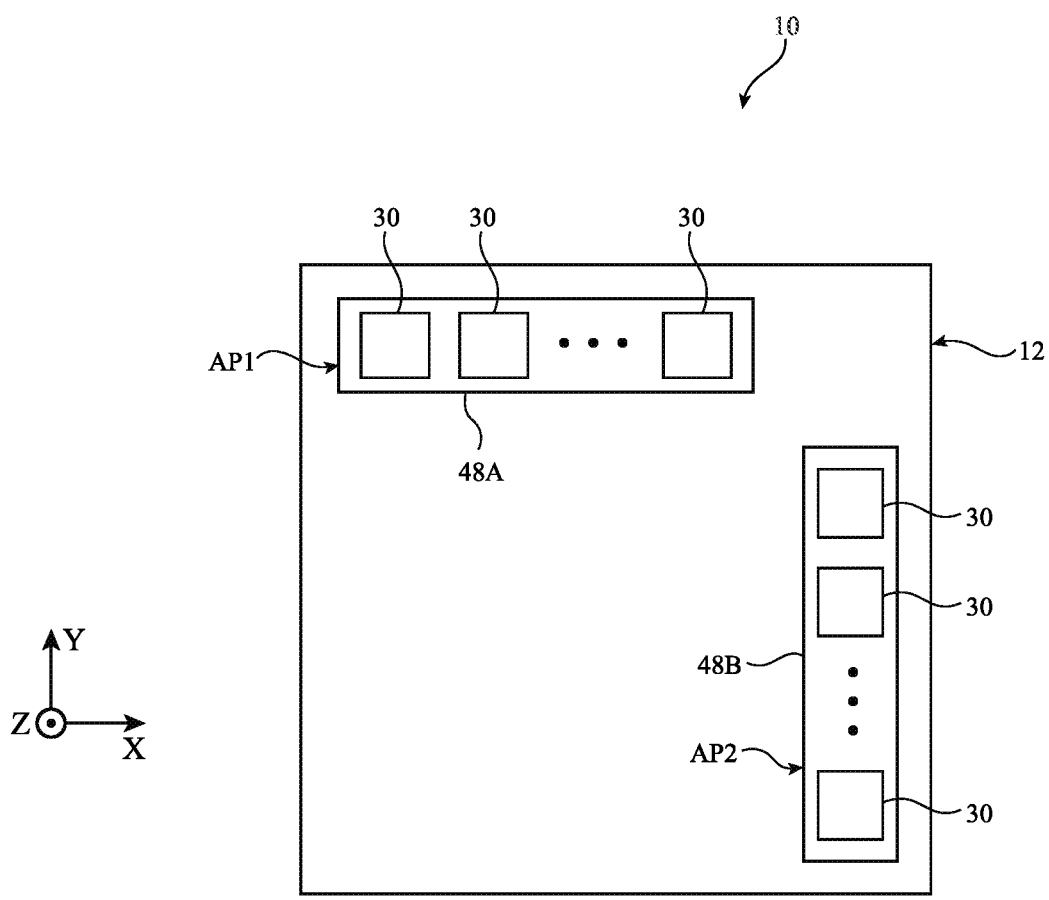
FIG. 3 is a top view showing how antennas may be distributed across multiple antenna panels at different locations and/or orientations in an electronic device in accordance with some embodiments.

FIG. 3 is a top view of device 10 showing one example of how antennas 30 may be distributed across multiple antenna panels. As shown in FIG. 3, the antennas 30 may include at least a first set of antennas 30 on a first substrate 48A and a second set of antennas 30 on a second substrate 48B disposed within or on housing 12 of device 10. The first set of antennas may, for example, be arranged in a one-dimensional array pattern on substrate 48A whereas the second set of antennas are arranged in a one-dimensional pattern on substrate 48B. This is merely illustrative and, if desired, the antennas may be arranged in two-dimensional array patterns or in other patterns. The antennas 30 on substrate 48A may form a first phased antenna array 46 whereas the antennas 30 on substrate 48B may form a second phased antenna array 46 (FIG. 2). This is merely illustrative and, if desired, the antennas 30 on each substrate may form part of a larger phased antenna array 46 that is distributed across multiple substrates 48.

Each substrate 48 may be a printed circuit substrate (e.g., a rigid or flexible printed circuit substrate), a ceramic substrate or a plastic substrate, a package substrate, a dielectric portion of housing 12, or other substrates, as examples. Substrates 48 may be planar or may be curved in one or two dimensions. Each substrate 48 and its corresponding antennas 30 may sometimes be referred to herein collectively as an antenna panel (AP) (sometimes also referred to herein as an antenna module). Substrate 48A and its antennas 30 may therefore form a first antenna panel AP1 whereas substrate 48B and its antennas 30 may form a second antenna panel AP2 that is separated from first antenna panel AP1 within housing 12. Each antenna panel AP may include a respective radio 26 mounted thereon, for example. Baseband circuitry for each antenna panel AP may be shared among all antenna panels AP, if desired.

Antenna panel AP1 may be oriented perpendicular to antenna panel AP2 or the antenna panels may have other relative orientations. Each antenna panel may include as few as one antenna 30 or may include more than one antenna 30. Device 10 may include more than two antenna panels AP. Multiple antenna panels AP may be distributed across different locations of device 10. Each antenna panel AP may form a corresponding set of signal beams in corresponding beam pointing directions. Distributing multiple antenna panels AP across device 10 may allow device 10 to provide RF coverage across a full sphere around device 10, for example.

Figure 4:
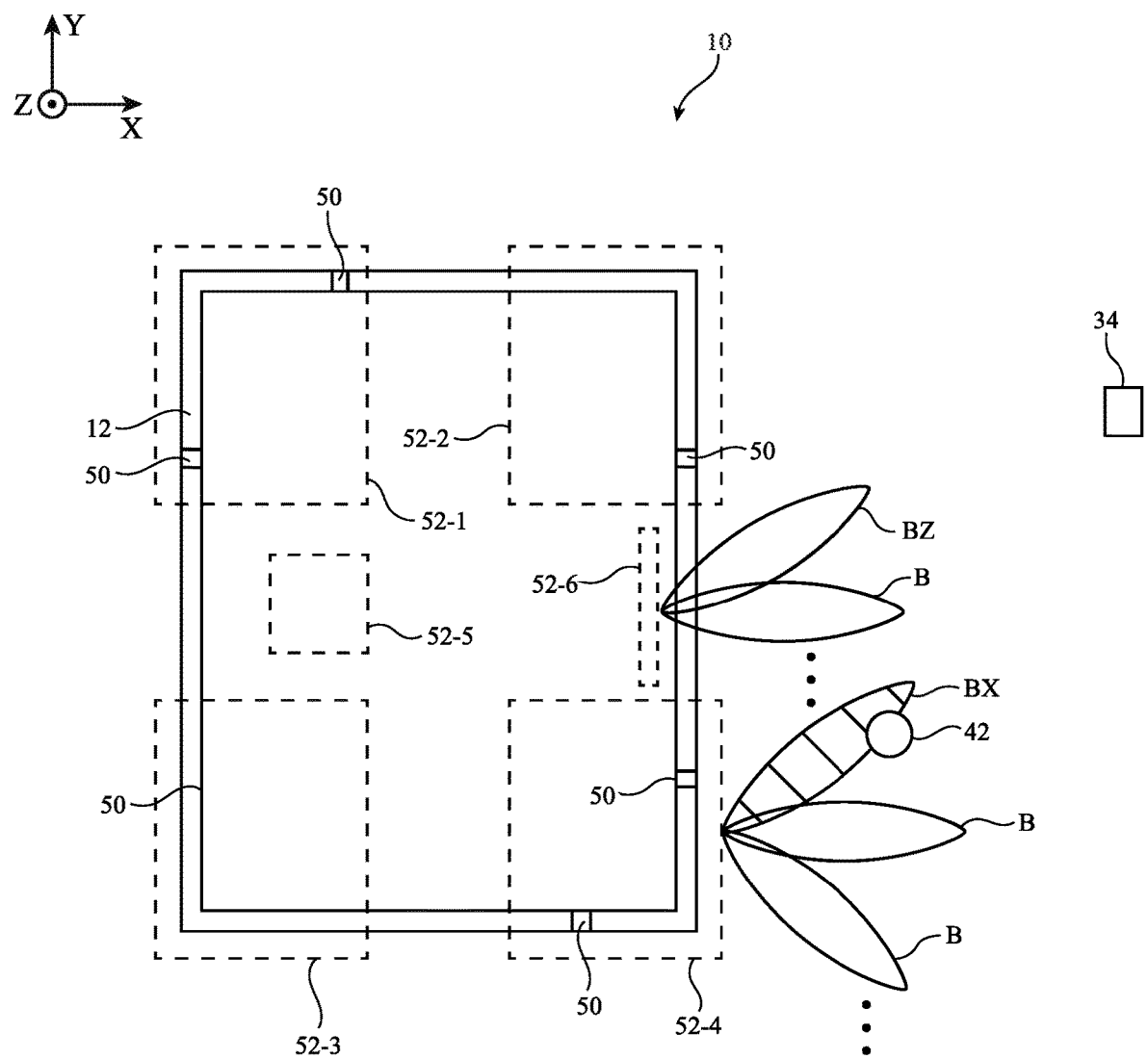
FIG. 4 is a top view showing illustrative locations where antenna panels may be mounted within an electronic device in accordance with some embodiments.

FIG. 4 is a top view showing illustrative locations for distributing antenna panels AP across device 10 in examples where device 10 forms a cellular telephone, tablet computer, or other portable electronic device. As shown in FIG. 4, one or more of the antennas 30 (e.g., one or more antenna panels AP) may be located within one or more regions 52 on or within device 10 such as region 52-1 at the top-left corner of device 10, region 52-2 at the top-right corner of device 10, region 52-3 at the bottom-left corner of device 10, region 52-4 at the bottom-right corner of device 10, one or more regions 52-5 within a central region of device 10, and/or one or more regions 52-6 laterally interposed between an active area of a display for device 10 and housing 12.

Separating two or more of the antennas (e.g., antenna panels) by relatively large distances and increasing the number of antennas may increase the resolution with which control circuitry 14 is able to determine form and steer signal beams around device 10. In the example of FIG. 4, one or more of the antennas located in regions 52-1, 52-2, 52-3, and 52-4 may have radiating elements (e.g., antenna resonating element arms) formed from conductive segments of housing 12 (e.g., peripheral conductive housing structures that run around the lateral periphery of device 10) that are separated/defined by dielectric-filled gaps 50 in housing 12. The antennas formed from conductive portions of housing 12 may also be used to convey cellular telephone data, WLAN data, GPS data, etc. The example of FIG. 4 is merely illustrative. In general, housing 12 may have any desired shape. Antenna panels AP that radiate through the front face of device 10 and/or the rear face of device 10 may radiate through dielectric cover layers of housing 12. Antenna panels AP that radiate through the sidewalls of device 10 (e.g., antenna panels located in region 52-6) may radiate through dielectric antenna windows in the peripheral conductive housing structures of housing 12, for example.

During radio-frequency signal transmission, an antenna panel AP having a field of view (FOV) overlapping base station 34 may be used to convey radio-frequency signals with base station 34. Each antenna panel AP may have a respective FOV and two or more antenna panels AP may have non-overlapping FOVs. A beam B of an antenna panel AP that overlaps base station 34 or that otherwise exhibits peak performance in communicating with base station 34 may be used to convey radio-frequency signals with base station 34. Control circuitry 14 may perform an antenna panel and/or beam selection operation to select the best-performing antenna panel AP and the best-performing beam B to use in communicating with base station 34 (e.g., an antenna panel AP and beam B facing or overlapping base station 34). For selection purposes, control circuitry 14 may use metrics like Signal to Noise Ratio (SNR), Reference Signal Received Power (RSRP) and Pathloss to determine which beams B and/or antenna panels AP to use for signal transmission, for example.

However, during signal transmission, some of the radio-frequency signals transmitted by antenna panel(s) AP may be incident upon external objects such as target object 42. The amount of radio-frequency energy exposure at target object 42 may be characterized by one or more radio-frequency (RF) energy exposure metrics. The RF exposure (RFE) metrics may include specific absorption rate (SAR) for radio-frequency signals at frequencies less than 6 GHz (in units of W/kg), maximum permissible exposure (MPE) or power density (PD) for radio-frequency signals at frequencies greater than 6 GHz (in units of $mW/cm^2$), and total exposure ratio (TER), which combines SAR and MPE.

Regulatory requirements often impose limits on the amount of RF energy exposure permissible for target object 42 within the vicinity of antenna(s) 30 over a specified time period (e.g., an SAR limit and a PD limit over a corresponding averaging period). Communication devices such as device 10 may be required by a regulatory body or authority (e.g., the FCC, ICNIRP, etc.) to comply with its regulatory limits on RFE (e.g., to keep the RFE produced by device 10 below the regulatory limits). Some devices ensure compliance with the regulatory limits by always applying maximum transmit power level backoff when transmitting signals such that RFE always remains below the regulatory limits. Such an approach is conservative in nature and can significantly reduce the throughputs that the devices can achieve.

In general, a throughput-optimizing antenna panel or beam selection operation may not result in a selection that is RFE compliant. A selection based on a criteria like SNR, RSRP, or Pathloss may result in RFE to human targets (e.g., target object 42) that exceeds the regulatory limits. This can in turn result in a transmit (TX) power limitation, thereby causing throughput reduction. On the other hand, RFE compliant antenna panel or beam selection operations can help avoid unnecessary reduction in TX power, thereby guaranteeing higher data throughput and coverage.

For example, in the scenario illustrated in FIG. 4, beam BX of an antenna panel AP located in region 52-4 may be oriented towards base station 34 but may overlap target object 42, which may produce RFE exceeding the regulatory limits without a transmit power reduction. While other beams B of this antenna panel do not overlap target object 42, the other beams B may be pointed away from base station 34 and may therefore not exhibit sufficient throughput. At the same time, one or more beams B of other antenna panels AP located in other regions of device 10 may overlap base station 34, such as beam BZ of an antenna panel located in region 52-6.

Control circuitry 14 may perform an RFE compliant antenna panel and beam selection operation. The RFE compliant antenna panel and beam selection operation may intelligently select an antenna panel AP and corresponding beam B for communicating with base station 34 in a manner that both meets the RFE limits, given the presence of one or more target objects 42 around device 10, and that maximizes wireless performance (e.g., throughput) in communicating with base station 34. The RFE compliant antenna panel and beam selection operation may dynamically and actively update the selected antenna panel AP and beam B to continue to maximize performance while satisfying the RFE limits as the number and location of target objects 42 change over time (e.g., as the user changes when and how they hold device 10 and/or as other body parts of the user or other persons enter and leave the vicinity of device 10).

The RFE compliant antenna panel and beam selection operation may utilize sensing results (sensor data) generated by one or more sensors on device 10 to help determine the position (e.g., range and angle) of target object 42 relative to device 10. Control circuitry 14 may calculate RFE that would be caused by transmitting with a given antenna panel AP and beam B given the sensed position. Based on the calculated RFE, maximum allowed TX power for each antenna panel AP or beam B may be calculated such that RFE remains within regulatory limits. Control circuitry 14 may then make use of the maximum TX power values to select the antenna panel AP and/or beam B for transmission that would guarantee highest throughput. In addition, device 10 may report RFE metrics to the network (base station 34). The network may use the reported RFE metrics to schedule device 10 on a given signal beam. This may include increasing or decreasing the amount of grants scheduled based on a given beam for that particular device 10.

In practice, different antenna panels AP can have similar signal reception levels (e.g., as characterized by wireless performance metrics such as SNR, RSRP, or Pathloss). Base station 34 would therefore receive UL transmissions with similar reception level and quality from each of the different antenna panels AP. At the same time, different antenna panels can cause different amounts of RFE. The RFE produced depends on the antenna characteristics and the position of target object 42 relative to the transmitting antenna panel and its beams. For example, an antenna panel in region 52-4 transmitting over beam BX of FIG. 4 may produce more RFE than an antenna panel in region 52-6 transmitting over beam BZ. By performing the RFE compliant antenna panel and beam selection operation, control circuitry 14 may prevent such scenarios from occurring, thereby satisfying RFE limits, while concurrently maximizing throughput and signal quality with base station 34.

Figure 5:
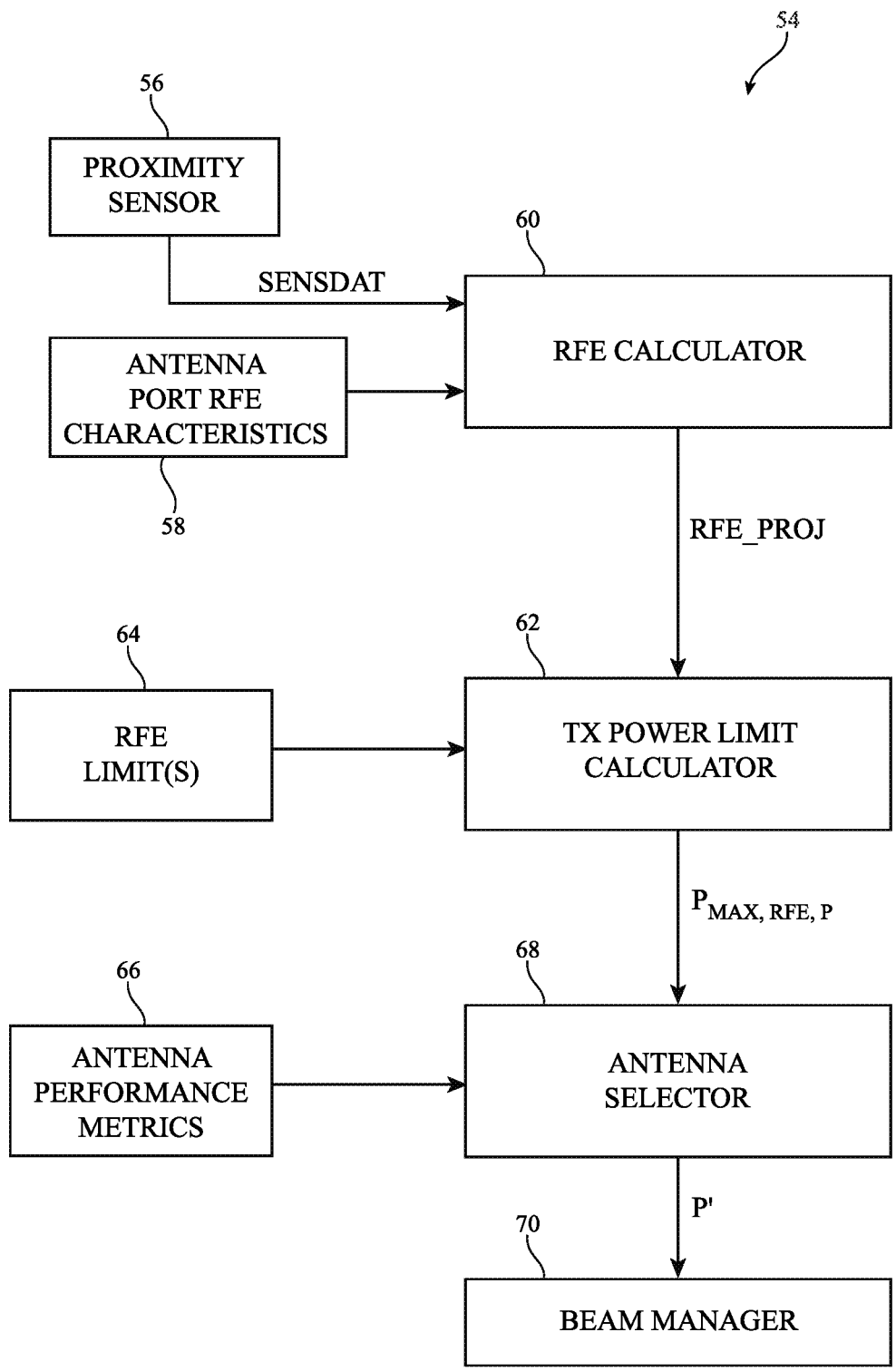
FIG. 5 is a diagram of illustrative circuitry for selecting an antenna panel and a beam of the antenna panel for use in communicating with a wireless base station while complying with RFE limits in accordance with some embodiments.

FIG. 5 is a diagram of illustrative circuitry 54 in device 10 that may be used to perform the RFE compliant antenna panel and beam selection operation. Some or all of the components of circuitry 54 may be implemented on control circuitry 14 of FIG. 1 (e.g., within baseband circuitry of wireless circuitry 24). The components of circuitry 54 may be implemented using any desired combination of software (e.g., one or more applications) and/or hardware (e.g., digital circuitry, analog circuitry, logic gates, memory, registers, databases, look up tables, signal processors, etc., implemented on, controlled by, and/or that perform operations executed by one or more processors in processing circuitry 18 of FIG. 1).

As shown in FIG. 5, circuitry 54 may include one or more sensors such as proximity sensor(s) 56. Proximity sensor 56 may have an output coupled to an input of RFE calculator 60 (sometimes referred to herein as RFE projector 60). RFE calculator 60 may have another input that receives antenna port RFE characteristics 58. RFE calculator 60 may have an output coupled to an input of TX power limit calculator 62 (sometimes referred to herein as TX power limit generator 62). TX power limit calculator 62 may have another input that receives RFE limit(s) 64. TX power limit calculator 62 may have an output coupled to an input of antenna selector 68. Antenna selector 68 may have another input that receives antenna performance metrics 66. Antenna selector 68 may have an output coupled to an input of beam manager 70. Antenna port RFE characteristics 58, RFE limit(s) 64, and/or antenna performance metrics 66 may be stored on storage circuitry 16 (FIG. 1) (e.g., in one or more registers, memory devices, storage media, look-up tables (LUTs), databases, other data structures, etc.).

Proximity sensor 56 may include any desired proximity sensor(s) on device 10 that detect (sense) the presence, location (e.g., two-dimensional or three-dimensional position, range to, angle of, angle-of-arrival from, etc.), and/or motion of one or more target objects 42 at, adjacent to, in the vicinity of, or near device 10. Proximity sensor 56 may generate sensor data SENSDAT indicative of the presence, location, and/or motion of target objects 42. Proximity sensor 56 may include, for example, capacitive proximity sensors, light-based proximity sensors, VSWR-based proximity sensors (e.g., that gather VSWR measurements using the antennas 30 on antenna panels AP), light-based proximity sensors (e.g., infrared proximity sensors or image sensor-based proximity sensors), lidar proximity sensors, and/or other sensors at one or more locations on device 10.

In some implementations that are described herein as an example, proximity sensor 56 may include radar sensors (e.g., spatial ranging circuitry or radar circuitry implemented using one or more radios 26 of FIG. 1). The radar sensors may transmit radar signals using one or more of the antennas 30 in one or more antenna panels AP and may receive reflected radar signals using one or more of the antennas 30 in one or more antenna panels AP. The radar sensors may detect the range between target object(s) 42 and different points on device 10 (e.g., points on antenna panels AP), the angular position of target object(s) 42 relative to the different points on device 10, whether target object(s) 42 are inanimate or animate (e.g., by comparing variations in the gathered position measurements over time to one or more thresholds), etc. If desired, device 10 may ignore any inanimate external objects detected using the radar signals for subsequent processing to comply with RFE limits (e.g., target objects 42 may include only animate objects that could potentially be a human body part). Proximity sensor 56 may transmit sensor data SENSDAT to RFE calculator 60. Proximity sensor 56 may generate sensor data SENSDAT periodically (e.g., by periodically transmitting and receiving radar signals while sweeping over each beam B of each antenna panel AP) or in response to any desired trigger condition.

Antenna port RFE characteristics 58 may include the RFE characteristics for each antenna port (e.g., each antenna 30) of each antenna panel AP in device 10. These characteristics may include the gain of each antenna 30, the radiation pattern of each antenna 30, etc. Antenna port RFE characteristics 58 may be pre-calibrated and stored on device 10, for example. RFE may be pre-calibrated for each antenna panel AP in device 10 and characterized based on radio access technology (RAT), frequency band, and possible position of target objects 42 (e.g., during manufacture, calibration, assembly, testing, or initialization of device 10). This characterization may be performed by operating device 10 at a maximum permissible transmit power $P_{MAX,LIMIT}$ and a specific UL duty cycle. The measured RFE results are stored in device 10 (e.g., in an RFE LUT) for each antenna panel AP indexed by the above-mentioned parameters. During regular operation of device 10 by an end user, the stored RFE results are used to project/estimate RFE caused to target objects 42 detected by proximity sensor 56. Based on the projected RFE values, antenna-panel-specific maximum transit powers may be computed.

For example, RFE calculator 60 may calculate, generate, estimate, and/or project the RFE that would be produced by each antenna panel AP (e.g., projected RFE values RFE_PROJ) based on antenna port RFE characteristics 58, the sensed position of target object(s) 42 as identified by sensor data SENSDAT, the radio access technology (RAT) implemented by the corresponding antenna panel AP, and the frequency band(s) handled by the corresponding antenna panel AP. RFE calculator 60 may, for example, compare sensor data SENSDAT to stored (pre-calibrated) RFE data (e.g., in the RFE LUT) to estimate/generate the projected RFE for the currently-sensed target object(s) 42 (e.g., at location(s) as identified by sensor data SENSDAT). RFE calculator 60 may transmit projected RFE values RFE_PROJ to TX power limit calculator 62.

RFE limits 64 may be specified by a regulatory body or authority associated with the region where device 10 is being operated. RFE limits 64 may be stored upon initialization or manufacture of device 10 and may, if desired, be updated over time and/or as device 10 moves throughout the world. RFE limits 64 may specify the maximum permissible RFE (e.g., SAR, PD, MPE, etc.) produced by device 10 over a given amount of time (e.g., a regulatory averaging period).

TX power limit calculator 62 may generate a maximum RFE-related TX power level $P_{MAX,RFE,P}$ for each antenna panel AP in device 10 (e.g., where each antenna panel AP is labeled by a corresponding index P) based on RFE limits 64 and projected RFE values RFE_PROJ. TX power limit calculator 62 may generate (e.g., calculate, compute, produce, etc.) maximum RFE-related TX power levels $P_{MAX,RFE,P}$ using the equation $P_{MAX,RFE,P} = P_{MAX,LIMIT,P} - PBO_P$. $P_{MAX,LIMIT,P}$ is the maximum transmit power for the Pth antenna panel AP, as specified by hardware and emission limits. Maximum transmit powers $P_{MAX,LIMIT,P}$ may, for example, be the per-antenna panel transmit power levels used by the antenna panels to generate RFE LUT values for each antenna panel (e.g., during pre-calibration of device 10). $PBO_P$ is the per-antenna panel power backoff required to be applied for the Pth antenna panel AP, if any, to maintain RFE within the regulatory limits specified by RFE limits 64.

TX power limit calculator 62 may generate (e.g., calculate, compute, produce, etc.) power backoffs $PBO_P$ using the equation $PBP_P = -\min(10*\log_{10}(RFE_{LIMIT}/RFE\_PROJ_P), 0)$. $RFE_{LIMIT}$ is the regulatory limit specified by RFE limits 64. $RFE\_PROJ_P$ is the projected RFE value for the Pth antenna panel AP as specified by the projected RFE values RFE_PROJ generated by RFE calculator 60. TX power limit calculator 62 may transmit the generated maximum transmit powers $P_{MAX,LIMIT,P}$ to antenna selector 68.

Antenna selector 68 may select an antenna panel AP for communications based on maximum RFE-related TX power levels $P_{MAX,RFE,P}$ and antenna performance metrics 66. The selected antenna panel AP may be identified by index P'. Antenna performance metrics 66 may include SNR characteristics, RSRP characteristics, Pathloss characteristics, or other wireless performance metric characteristics of each of the antenna panels AP. Depending on the antenna performance metrics 66 (sometimes referred to herein as antenna characteristics 66) and depending on the presence of a target object 42 close to some antenna panel AP, the allowed transmit power for each antenna panel AP might be very different. Lower transmit powers may result in reduced UL throughput and coverage.

Antenna selector 68 may prefer antenna panels AP having higher RFE-related TX power level $P_{MAX,RFE,P}$ over antenna panels AP having lower allowed TX powers. This can be utilized either to select higher average TX power while RFE is maintained within regulatory limits, resulting in increased UL throughput and improved UL coverage, or to minimize the overall RFE by selecting an antenna panel AP that produces less RFE while using the same UL transmit power. Antenna selector 68 may transmit information identifying the selected antenna panel AP (e.g., index P') to beam manager 70. While antenna selector 68 is described herein as selecting an antenna panel for the sake of illustration, antenna selector 68 may more generally select any desired set of one or more antennas 30, which may be labeled by index P' (e.g., antennas 30 across one or more antenna panels). Beam manager 70 may select a beam B for communication with base station 34 in a manner that both complies with RFE regulations and optimizes wireless performance.

Each beam radiating out of an antenna panel AP may cause a certain amount of RFE, which depends on the RF characteristic of the beam. Besides the RF characteristic of a certain beam, the produced RFE also depends on whether a target object 42 is located in the beam direction and the distance between the antenna panel and the target object. Using the pre-calibrated RFE metric of each beam and the sensed position of target object 42, RFE values for each beam can be projected and used for beam selection.

Figure 6:
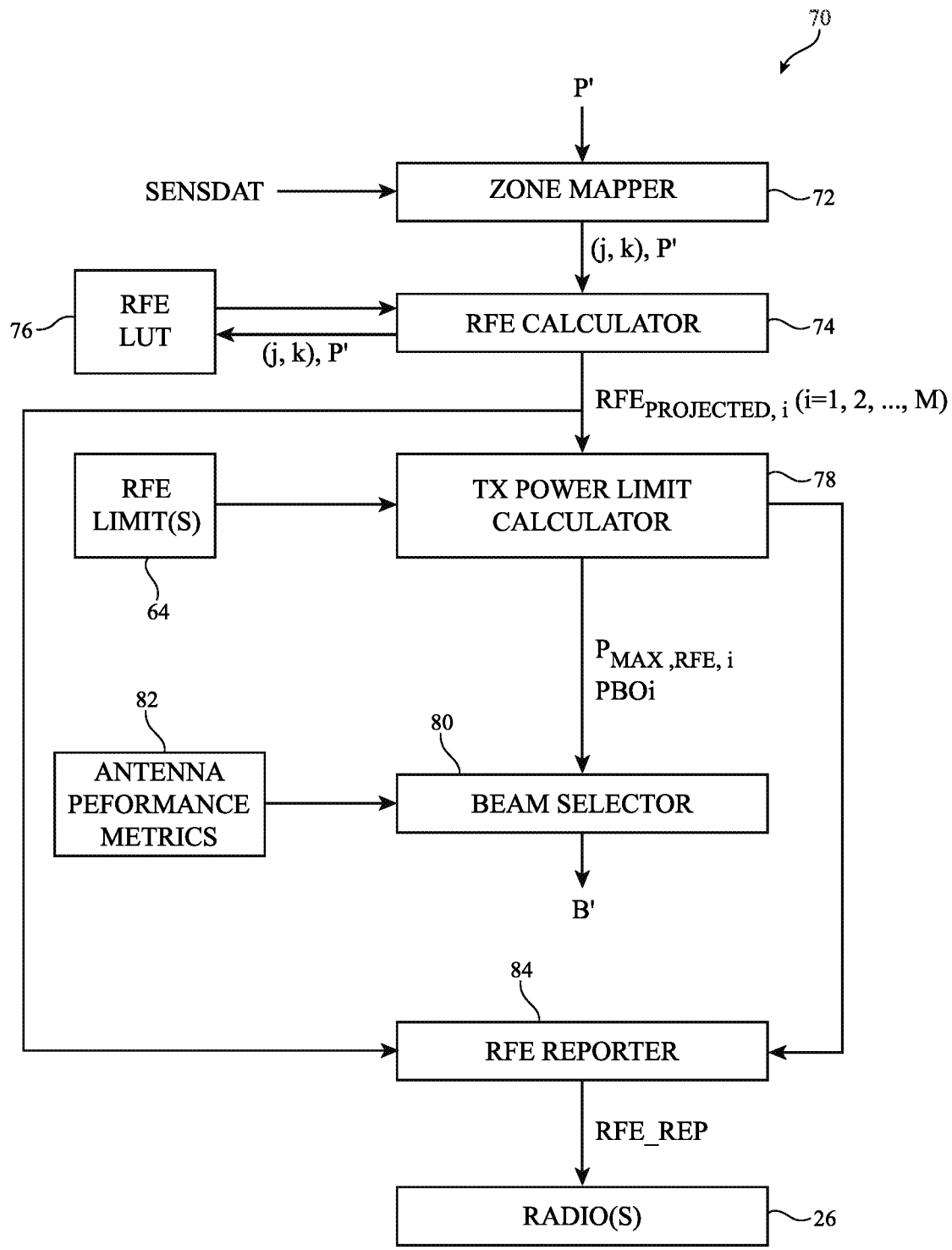
FIG. 6 is a diagram of an illustrative beam manager for selecting a beam of an antenna panel for use in communicating with a wireless base station while complying with RFE limits in accordance with some embodiments.

FIG. 6 is a diagram of beam manager 70. Some or all of the components of beam manager 70 may be implemented on control circuitry 14 of FIG. 1 (e.g., within baseband circuitry of wireless circuitry 24). The components of beam manager 70 may be implemented using any desired combination of software (e.g., one or more applications) and/or hardware (e.g., digital circuitry, analog circuitry, logic gates, memory, registers, databases, look up tables, signal processors, etc., implemented on, controlled by, and/or that perform operations executed by one or more processors in processing circuitry 18 of FIG. 1).

As shown in FIG. 6, beam manager 70 may include a zone mapper such as zone mapper 72. Zone mapper 72 may receive index P' identifying the antenna panel AP selected by antenna selector 68 of FIG. 5. Zone mapper 72 may also receive sensor data SENSDAT. Zone mapper 72 may identify (e.g., generate), based on sensor data SENSDAT and index P', a spatial zone in the FOV of the selected antenna panel AP in which one or more target objects 42 are located. For example, zone mapper 72 may compare a range and/or angle of a target object 42 as identified by sensor data SENSDAT to different predetermined spatial zones (each defined by a set of ranges and angles) to identify which spatial zone the target object is located in (e.g., zone mapper 72 may map target object(s) 42 into predefined spatial zones around antenna panel AP by choosing spatial zones whose range and angular orientations are close to the range and angle of the detected target object as specified by sensor data SENSDAT). The spatial zone may, for example, be identified over two spatial coordinates by an indices (j,k) (e.g., where j is indicative of the ranges and k is indicative of the angles associated with the zone). Zone mapper 72 may transmit index P' and information identify the spatial zone(s) in which target object(s) 42 are located (e.g., indices (j,k) of the spatial zone(s)) to RFE calculator 74.

RFE LUT 76 may store pre-calibrated RFE values measured for each beam B of each antenna panel AP. The entries of RFE LUT 76 may, for example, include RFE values parameterized by beams and zones. The RFE values stored on RFE LUT 76 may be obtained by operating device 10 at its maximum permissible hardware transmit power (e.g., $P_{MAX,LIMIT}$) and a 100% duty cycle. The entries of RFE LUT 76 may be updated over time if desired.

Each beam B of the selected antenna panel AP (e.g., the antenna panel having index P') may be identified by a corresponding index i (e.g., from i=1 to i=M when there are M total beams). The ith beam B of the selected antenna panel AP may therefore sometimes be referred to herein as beam $B_i$. RFE calculator 74 may generate projected RFE values $RFE_{PROJECTED,i}$ for each of the beams $B_i$ of the selected antenna panel AP based on the spatial zone(s) identified by zone mapper 72, index P', and RFE LUT 76.

For example, RFE calculator 74 may use the indices (j,k) of the identified spatial zone(s) and index P' of the selected antenna panel to retrieve the stored RFE values pre-calibrated for target objects located within those spatial zone(s) of the selected antenna panel AP from RFE LUT 76. RFE calculator 74 may generate (e.g., calculate) projected RFE values $RFE_{PROJECTED,i}$ for each beam $B_i$ of the selected antenna panel using the equation: $RFE_{PROJECTED,i}$=max($RFE_{ij,P'}$, $RFE_{ik,P'}$) (e.g., the largest RFE for either of the two spatial coordinates used to define the corresponding spatial zone for the selected antenna panel). RFE calculator 74 may transmit projected RFE values $RFE_{PROJECTED,i}$ to TX power limit calculator 78 and to RFE reporter 84 of beam manager 70.

TX power limit calculator 78 may generate a TX power back off $PBO_i$ for each beam $B_i$ based on projected RFE values $RFE_{PROJECTED,i}$ and RFE limits 64, such that the regulatory limits are not exceeded. TX power limit calculator 78 may generate the power backoff $PBO_i$ for each beam $B_i$, if any, using the equation $PBO_i$=−min(10*$\log_{10}$($RFE_{AVAILABLE}$/$RFE_{PROJECTED,i}$), 0). $RFE_{AVAILABLE}$ and $RFE_{PROJECTED,i}$ may be in units of RFE rather than power, where $RFE_{AVAILABLE}$ is an amount of RFE budget available. TX power limit calculator 78 may then generate a TX power limit $P_{MAX,RFE,i}$ for each beam $B_i$ using the equation $P_{MAX,RFE,i}$=$P_{MAX,LIMIT,i}$−$PBO_i$, where $P_{MAX,LIMIT,i}$ is the maximum transmit power as per hardware and emission limits (e.g., as used to derive the entries of RFE LUT 76). TX power limit calculator 78 may transmit TX power limits $P_{MAX,RFE,i}$ and power backoffs $PBO_i$ to beam selector 80 and RFE reporter 84.

Beam selector 80 (sometimes referred to herein as beam management engine 80 or beam manager 80) may select a beam B' for use in communicating with base station 34 based on the TX power limits $P_{MAX,RFE,i}$ and the power backoffs $PBO_i$ for each beam $B_i$, and based on antenna performance metrics 82 (e.g., antenna performance metrics 66 of FIG. 5 such as SNR, RSRP, Pathloss, etc.). Beam selector 80 may, for example, prefer to select a beam B' that allows for a higher TX power to maximize throughput and UL coverage. In situations where device 10 does not transmit close or at its power limits (e.g., in near cell scenarios), beam selector 80 can minimize RFE by selecting a beam that causes less RFE. Beam selector 80 may switch to another active beam of the same antenna panel AP (e.g., the selected antenna panel with index P') or to a beam on a different antenna panel AP (selected beam B' may be a beam of the selected antenna panel with index P' or may be a beam of a different antenna panel). Beam selector 80 may output information identifying the selected beam B'. Control circuitry 14 may then control wireless circuitry 24 to communicate with base station 34 using the selected beam B' and the corresponding antenna panel (e.g., the selected antenna panel with index P').

RFE reporter 84 may generate an RFE report RFE_REP and may provide RFE report RFE_REP to radio(s) 26 for transmission to base station 34. RFE report RFE_REP may include, for example, each projected RFE value $RFE_{PROJECTED,i}$ generated by RFE calculator 74 for each of the beams $B_i$, the TX power limits $P_{MAX,RFE,i}$ and the power backoffs $PBO_i$ generated by TX power limit calculator 78 for each of the beams $B_i$, information identifying selected beam B', per-panel projected RFE values RFE_PROJ (FIG. 5), and/or any other desired RFE-related information. Reporting this information to base station 34 (e.g., in RFE report RFE_REP) may allow the network to update UL scheduling and/or beam selection for device 10 in a way that optimizes performance without exceeding RFE limits.

RFE reporter 84 may, for example, include projected PD values per beam $B_i$ and/or per antenna panel AP in RFE report RFE_REP. The projected PD values (e.g., from projected RFE values $RFE_{PROJECTED,i}$) may include absolute or relative values (e.g., in mW/cm²). For absolute values, the network may, for example, compare the PD values of different beams and may select a beam that produces a lower PD. For relative values (e.g., PD in % relative to the regulatory PD limit), the network can compare the relative PD values of different beams and can select a beam that causes lower BD. The network may update scheduling for device 10 in a manner that accommodates the selected beam and/or may instruct device 10 of the selected beam for use in subsequent transmission. If desired, the network may also decide to increase or decrease scheduled resources for device 10 depending on whether or not the relative PD exceeds the regulatory limit. For example, the network may choose to switch a beam that only causes a PD of 50% relative to the RFE limit, which would allow the network to increase UL scheduling by a factor of two, doubling UL throughput.

Additionally or alternatively, RFE reporter 84 may include RFE-related TX power limits per beam $B_i$ (e.g., $P_{MAX,RFE,i}$) and/or per antenna panel AP (e.g., $P_{MAX,RFE,P}$ of FIG. 5) in RFE report RFE_REP. In other words, for each beam, device 10 can report the maximum TX power it can transmit as per its RFE regulatory limits. The network may compare TX power values of different beams and can select a beam that allows for higher TX power values, resulting in increased throughput and coverage.

Additionally or alternatively, RFE reporter 84 may include power backoffs $PBO_i$ per beam $B_i$ and/or per antenna panel AP in RFE report RFE_REP. In other words, for each beam $B_i$, device 10 may report the amount of transmit power backoff it applies due to RFE constraints. The network may prefer to use a beam that does not require a TX power back off, or at least a beam that requires less TX power backoff to optimize throughput and coverage.

Radio(s) 26 may transmit RFE report RFE_REP to base station 34 using any desired waveforms. As one example, radio(s) 26 may transmit RFE report RFE_REP in a Media Access Control (MAC) Control Element (CE) or via Uplink Control Information (UCI). Both MAC CE and UCI may be altered to carry the required information from RFE report RFE_REP (e.g., in the communication protocol governing communications between device 10 and base station 34). Device 10 may transmit RFE report RFE_REP periodically (e.g., every X ms) or in response to an event or trigger condition (e.g., when the information to be reported changes such as when a value to be reported changes by more than a threshold amount).

Upon transmission of RFE report RFE_REP, device 10 may immediately begin to communicate with base station 34 using the selected antenna panel AP and the selected beam B' or may wait for an updated scheduling grant (e.g., a UL grant) to be received from base station 34 (e.g., providing a grant for device 10 to communicate using the selected antenna panel AP or beam B' or using some other beam selected by the network). In general, base station 34 and/or the network may perform any desired operations based on RFE report RFE_REP. For example, the network may control (schedule) device 10 to change its active beam B, may schedule more or fewer resources to device 10 for subsequent communications (e.g., by changing the assigned UL duty of device 10), etc. As one example, when RFE report RFE_REP indicates that no human target is present facing base station 34, base station 34 may grant more resources and/or increase the UL duty cycle of device 10.

Figure 7:
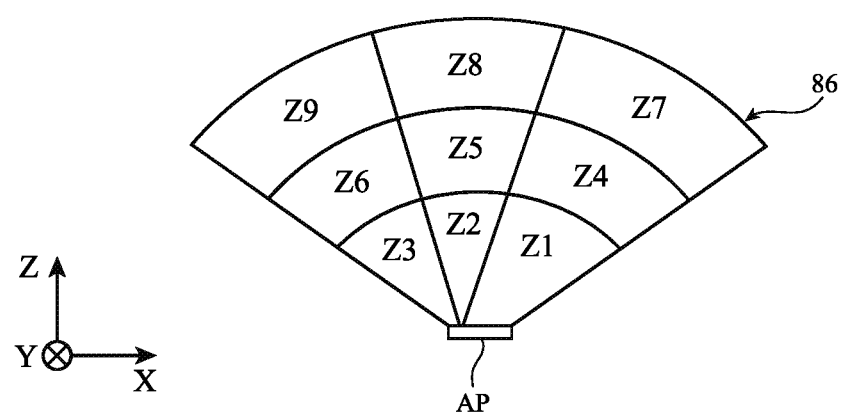
FIG. 7 is a diagram showing how a target object may be mapped to a spatial zone relative to an antenna panel using sensor data in accordance with some embodiments.

FIG. 7 is a diagram showing how a spatial region overlapping a given antenna panel AP may be divided into spatial zones mapped by zone mapper 72 of FIG. 6. As shown in FIG. 6, zone mapper 72 may map spatial regions within FOV 86 of a given antenna panel AP into corresponding zones Z. Nine zones Z (e.g., Z1, Z2, ..., Z9) are shown in FIG. 7. In general, FOV 86 may be divided into any desired number of zones. Each zone may be defined by ranges (sets) of two or more spatial coordinates (e.g., as labeled by indices (j,k) of FIG. 6). The spatial coordinates may be range, angle-of-arrival, distance, elevation angle, azimuth angle, etc.

Zone mapper 72 (FIG. 6) may map each target object 42 detected by proximity sensor 56 (FIG. 5) to a corresponding zone Z (e.g., by comparing sensor data SENSDAT to sensor data known to correspond to each zone Z in FOV 86). Zone mapper 72 may output the indices (j,k) that represent the mapped zone Z to RFE calculator 74. For example, if radar data generated by the proximity sensor (e.g., gathered by antenna panel AP) indicates that target object 42 is located within the range of positions spanned by zone Z1, zone mapper 72 may output the indices (j,k) of zone Z1. In general, for the same transmit power, target object 42 will produce more RFE within zones Z that are closer to antenna panel AP than antenna zones Z that are farther from antenna panel AP.

Figure 8:
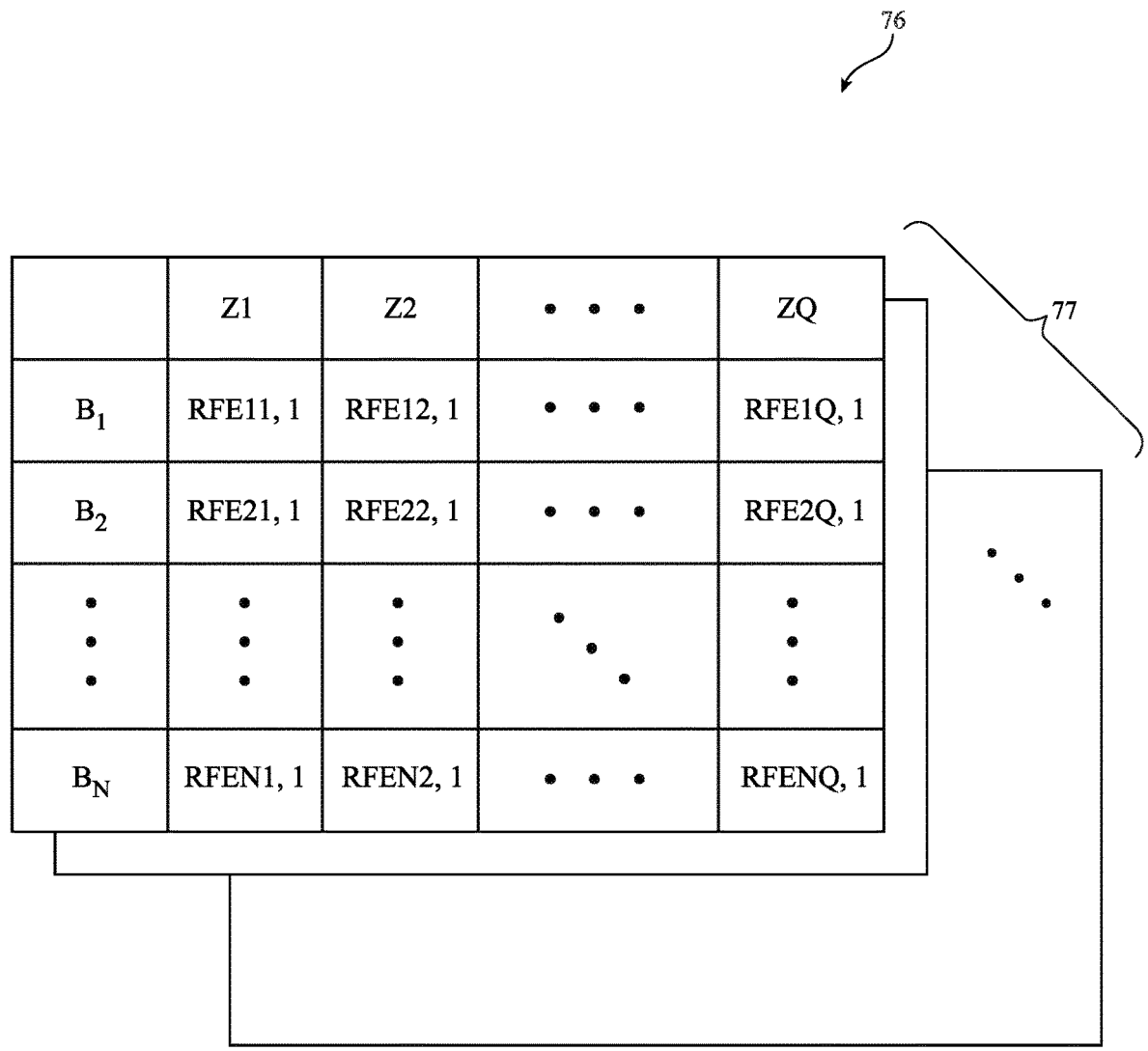
FIG. 8 is a diagram of an illustrative RFE look-up table (LUT) that may be used in selecting a beam of an antenna panel for use in communicating with a wireless base station while complying with RFE limits in accordance with some embodiments.

FIG. 8 is a diagram of RFE LUT 76 of FIG. 6. As shown in FIG. 8, the entries of RFE LUT 76 may be parameterized by columns of zone Z (e.g., from zone Z1 to zone ZQ) and rows of beam $B_i$ (e.g., from beam $B_1$ to beam $B_N$). RFE LUT 76 may include different tables 77 for each frequency band. The entries of RFE LUT 76 may include RFE values pre-calibrated for device 10 using each frequency band, known position within a given zone Z, and signal beam $B_i$.

RFE calculator 74 may project the RFE of target object 42 for a given beam $B_i$ by retrieving the appropriate entry from RFE LUT 76 based on the active frequency band, the mapped zone Z (e.g., as determined by zone mapper 72 based on sensor data SENSDAT), and the corresponding beam B. RFE calculator 74 may output the corresponding entry as projected RFE value $RFE_{PROJECTED,i}$. The entries of RFE LUT 76 may be populated during pre-calibration of device 10, for example. The entries of RFE LUT 76 may be updated over time if desired.

Figure 9:
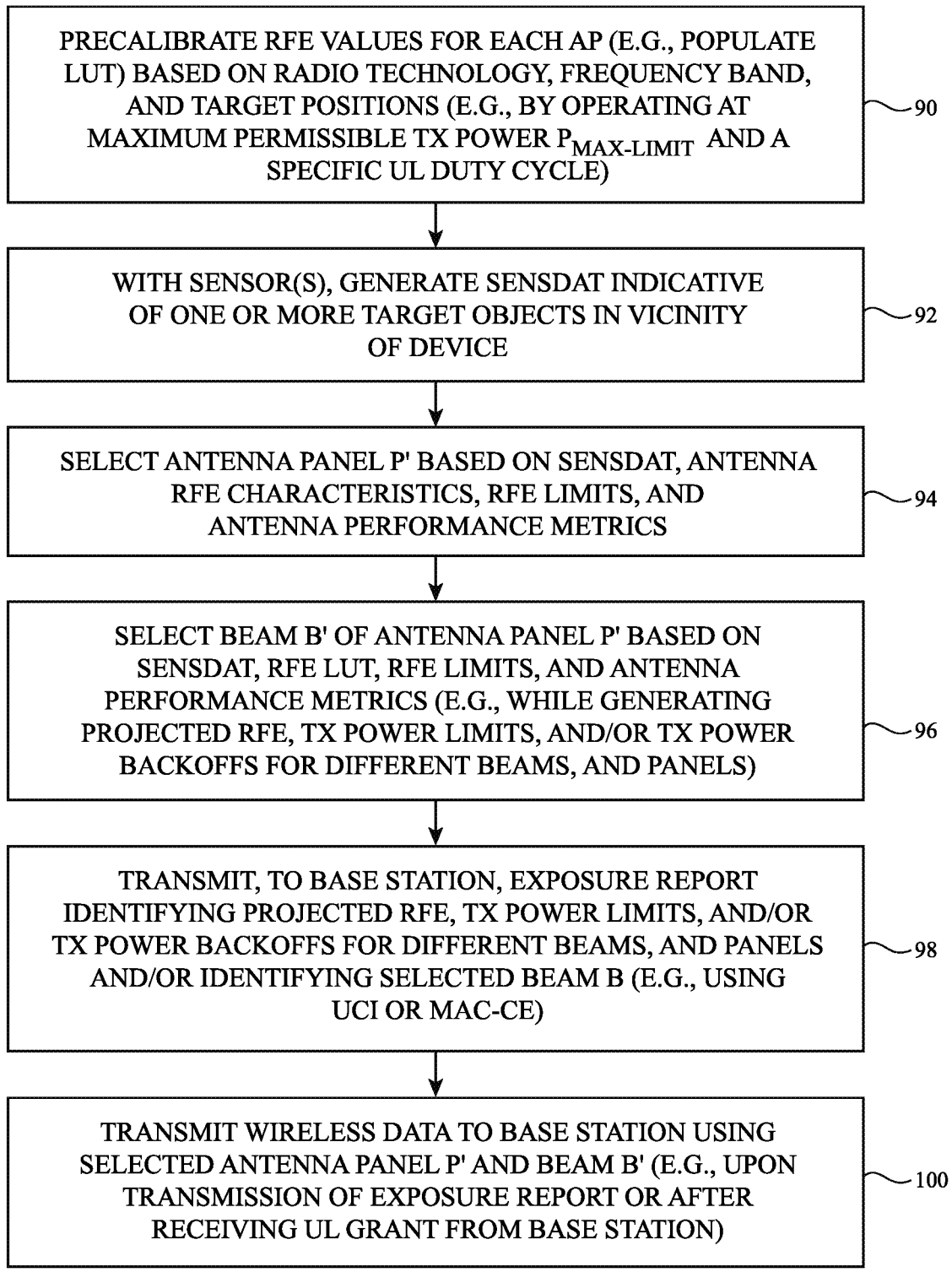
FIG. 9 is a flow chart of illustrative operations involved in selecting an antenna panel for use in communication, selecting a beam of the antenna panel for use in communication, and reporting RFE information to a wireless base in accordance with some embodiments.

FIG. 9 is a flow chart of operations that may be performed by circuitry 54 of FIG. 5 to communicate with base station 34 in a manner that optimizes wireless performance while also complying with regulatory RFE limits. At operation 90, device 10 may pre-calibrate RFE values for each antenna panel AP over different RATs, frequency bands, and target positions around the antenna panels. These pre-calibrated values may be stored in RFE LUT 76 (e.g., by gathering RFE values using signals transmitted at maximum permissible TX power $P_{MAX,LIMIT}$ and a specific UL duty cycle, while changing the position of a test target object around the antenna panels). This pre-calibration may occur in factory, during calibration, during manufacture, and/or during initialization of device 10 (e.g., prior to operation by an end user).

At operation 92 (e.g., during operation of device 10 by an end user), proximity sensor(s) 56 of FIG. 5 may generate sensor data SENSDAT. Sensor data SENSDAT may be indicative of the presence and position of one or more target objects 42 around device 10.

At operation 94, circuitry 54 may select an antenna panel AP (e.g., having index P') for subsequent communications with base station 34 based on sensor data SENSDAT, antenna port RFE characteristics 58, RFE limits, and antenna performance metrics 66 of FIG. 5. Circuitry 54 may, more generally, select any desired set of antennas 30 distributed across one or more antenna panels for communicating with base station 34.

At operation 96, beam manager 70 may select beam a beam B' for subsequent communications with base station 34 based on sensor data SENSDAT, RFE LUT 76, RFE limits 64, and antenna performance metrics 82. This may involve the generation of RFE information associated with each beam $B_i$ such as projected RFE values $RFE_{PROJECTED,i}$, TX power limits $P_{MAX,RFE,i}$, and TX power backoffs $PBO_i$ for one or more of the antenna panels (e.g., for at least the antenna panel with index P').

At operation 98, RFE reporter 84 and radio(s) 26 may transmit RFE report RFE_REP to base station 34. RFE report RFE_REP may include per-panel projected RFE values $RFE_{PROJECTED,P}$, per-beam projected RFE values $RFE_{PROJECTED,i}$, per-beam TX power limits $P_{MAX,RFE,i}$, per-beam TX power backoffs $PBO_i$, and/or information identifying selected beam B'. Radio(s) 26 may transmit RFE report RFE_REP using a MAC CE or using UCI, as examples. Base station 34 and/or the network may use RFE report RFE_REP to update or change UL scheduling (grants) for device 10, to update the active beam B used by device 10, etc.

At operation 100, device 10 may transmit wireless data to base station 34 using the selected antenna panel AP (e.g., with index P'), selected beam B', and/or a beam as selected by the network based on RFE report RFE_REP. Device 10 may transmit the wireless data upon transmission of the RFE report (e.g., without waiting for confirmation or assignment from the network) or upon receipt of an UL grant or updated UL scheduling from base station 34 as generated by the network in response to RFE report RFE_REP.

This RFE-based antenna selection and beam management procedure may help to maximize UL transmit power level while maintaining the RFE generated by device 10 within regulatory limits, resulting in a maximized UL throughput and improved UL coverage. Additionally or alternatively, this may serve to minimize overall RFE produced by device 10 by selecting an antenna panel and/or beam that causes less RFE while using the same amount of UL transmit power. RFE metric reporting per beam and antenna panel (e.g., using RFE report RFE_REP) may assist the network in performing optimized beam selection and UL grant scheduling.

Figure 10:
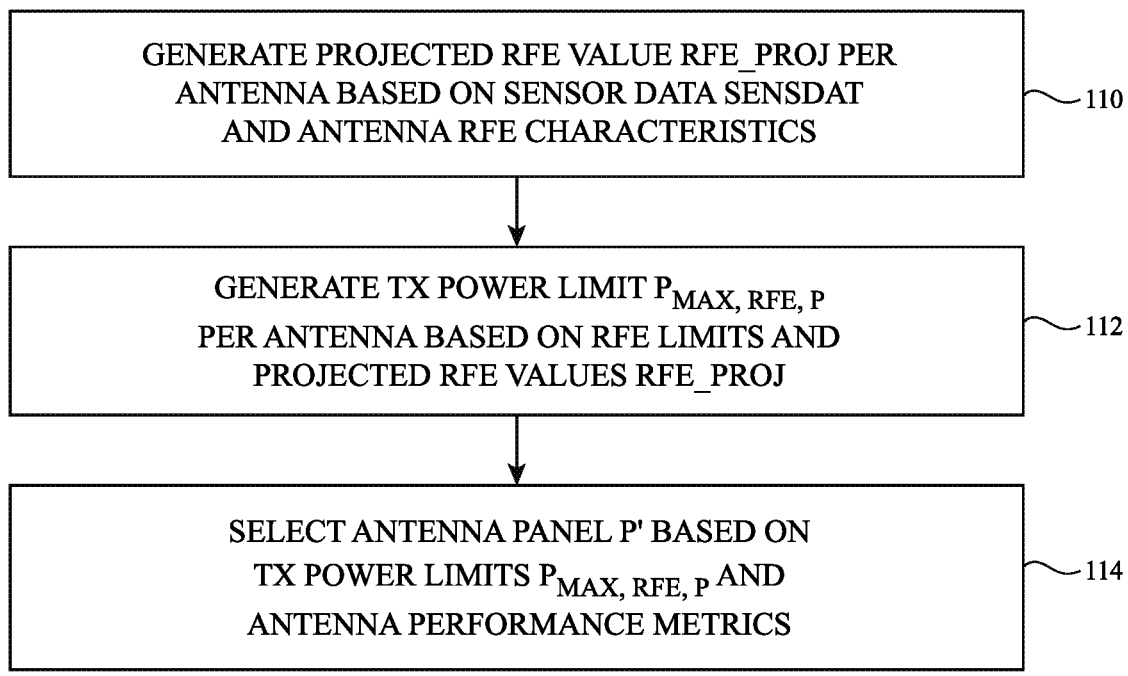
FIG. 10 is a flow chart of illustrative operations involved in selecting an antenna panel for use in communicating with a wireless base station while complying with RFE limits in accordance with some embodiments.

FIG. 10 is a flow chart of illustrative operations that may be performed by circuitry 54 (FIG. 5) to select an antenna panel (or a set of antennas 30) for communication with base station 34. The operations of FIG. 10 may, for example, be performed while processing operation 94 of FIG. 9.

At operation 110, RFE calculator 60 may generate projected RFE values RFE_PROJ per (for each) antenna, antenna port, and/or antenna panel AP based on sensor data SENSDAT and antenna port RFE characteristics 58 (sometimes referred to herein as per-panel projected RFE values RFE_PROJ).

At operation 112, TX power limit calculator 62 may generate TX power limit PMAX,RFE,P for each antenna, antenna port, and/or antenna panel AP based on RFE limits 64 and projected RFE values RFE_PROJ.

At operation 114, antenna selector 68 may select an antenna panel AP (of index P') or a set of antenna panels for subsequent communications based on TX power limits $P_{MAX,REF,P}$ and antenna performance metrics 66. Antenna selector 68 may provide information identifying the selected antenna panel or set of antenna panels (e.g., index P') to beam manager 70.

Figure 11:
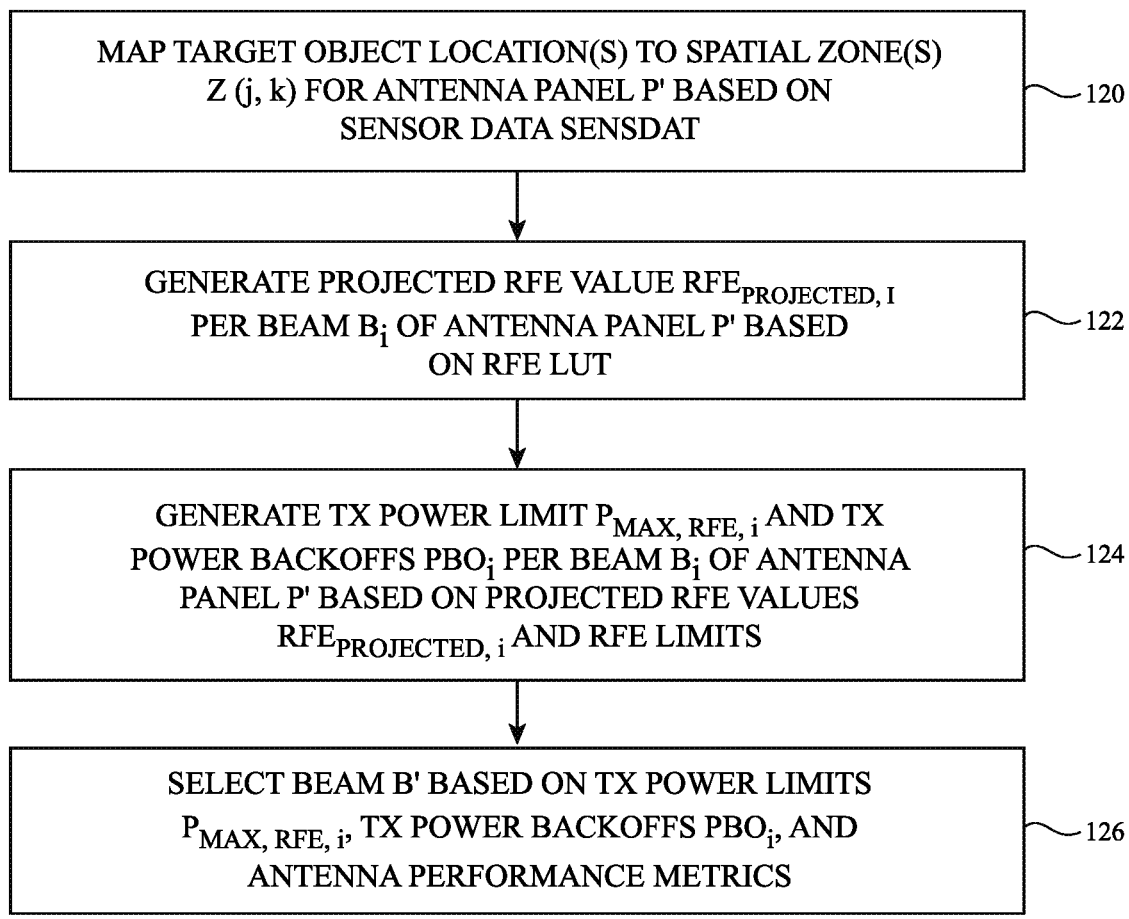
FIG. 11 is a flow chart of illustrative operations involved in selecting a beam of an antenna panel for use in communicating with a wireless base station while complying with RFE limits in accordance with some embodiments.

FIG. 11 is a flow chart of illustrative operations that may be performed by beam manager 70 (FIG. 6) to select a beam B' for communication with base station 34. The operations of FIG. 11 may, for example, be performed while processing operation 96 of FIG. 9.

At operation 120, zone mapper 72 (FIG. 6) may map target object(s) 42 around device 10 to spatial zone(s) Z for the selected antenna panel (or set of antennas) or any other antenna panel (or set of antennas) based on sensor data SENSDAT. Zone mapper 72 may output the indices (j,k) of the spatial zone(s) Z containing target object(s) 42 to RFE calculator 74.

At operation 122, RFE calculator 74 may generate projected RFE values $RFE_{PROJECTED,i}$ for each beam $B_i$ of the selected antenna panel (or set of antennas) or any other antenna panel (or set of antennas) based on RFE LUT 76 and the mapped zone(s) (e.g., indices (j,k)) (sometimes referred to herein as per-beam RFE values $RFE_{PROJECTED,i}$).

At operation 124, TX power limit calculator 78 may generate TX power limits $P_{MAX,RFE,i}$ and TX power backoffs $PBO_i$ for the selected antenna panel (or set of antennas) or any other antenna panel (or set of antennas) (sometimes referred to herein as per-beam power limits $P_{MAX,RFE,i}$ and per-beam TX power backoffs $PBO_i$) based on projected RFE values $RFE_{PROJECTED,i}$ and RFE limits 64.

At operation 126, beam selector 80 may select beam B' based on TX power limits $P_{MAX,RFE,i}$, TX power backoffs $PBO_i$, and antenna performance metrics 82. Device 10 may subsequently use the selected antenna panel (or set of antennas) and beam B' to transmit wireless data to base station 34 (e.g., at operation 100 of FIG. 9).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-11 (may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 1-4 may be implemented using hardware (e.g., circuit components, digital logic gates, one or more processors, etc.) and/or using software where applicable. While databases are sometimes described herein as providing data to other components, one or more processors, memory controllers, or other components may actively access the databases, may retrieve the stored data from the database, and may pass the retrieved data to the other components for corresponding processing. The regulatory RFE limits described herein need not be imposed by a government or regulatory body and may additionally or alternatively be imposed by a network operator, base station, or access point of a wireless network in which device 10 operates, by device 10 itself, by the manufacturer or designer of some or all of device 10, by wireless industry standards, protocols, or practices, by software running on device 10, etc.

For one or more aspects, at least one of the components set forth in one or more of the preceding figures may be configured to perform one or more operations, techniques, processes, or methods as set forth herein. For example, the control circuitry as described above in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

An apparatus (e.g., an electronic user equipment device, a wireless base station, etc.) may be provided that includes means to perform one or more elements of a method described in or related to any of the methods or processes described herein.

One or more non-transitory computer-readable media comprising instructions to cause an electronic device, upon execution of the instructions by one or more processors of the electronic device, to perform one or more elements of any method or process described herein.

An apparatus comprising logic, modules, or circuitry to perform one or more elements of a method described in or related to any of the method or process described herein.

An apparatus comprising: one or more processors and one or more non-transitory computer-readable storage media comprising instructions that, when executed by the one or more processors, cause the one or more processors to perform the method, techniques, or process as described herein.

A signal, datagram, information element, packet, frame, segment, PDU, or message or datagram may be provided as described in or related to any of the examples described herein.

A signal encoded with data, a datagram, IE, packet, frame, segment, PDU, or message may be provided as described in or related to any of the examples described herein.

An electromagnetic signal may be provided carrying computer-readable instructions, wherein execution of the computer-readable instructions by one or more processors is to cause the one or more processors to perform the method, techniques, or process as described in or related to any of the examples described herein.

A computer program comprising instructions, wherein execution of the program by a processing element is to cause the processing element to carry out the method, techniques, or process as described in or related to any of the examples described herein.

A signal in a wireless network as shown and described herein may be provided.

A method of communicating in a wireless network as shown and described herein may be provided.

A system for providing wireless communication as shown and described herein may be provided.

A device for providing wireless communication as shown and described herein may be provided.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. An electronic device comprising:
   a set of antenna panels at different locations and configured to transmit and receive radar signals; and
   one or more processors configured to
      identify a position of an object relative to the set of antenna panels based on the transmitted and received radar signals,
      transmit wireless data over an antenna panel in the set of antenna panels that is selected based on the identified position of the object, and
      generate projected radio-frequency exposure (RFE) values for the set of antenna panels based on the transmitted and received radar signals, the antenna panel in the set of antenna panels being configured to transmit a report to a wireless base station that includes the projected RFE values for the set of antenna panels.

2. The electronic device of claim 1,
   wherein the antenna panel in the set of antenna panels is selected based on the projected RFE values.

3. The electronic device of claim 2, wherein the one or more processors is further configured to:
   generate transmit power limits for the set of antenna panels based on the projected RFE values and a regulatory RFE limit, wherein the antenna panel in the set of antenna panels is selected based on the transmit power limits.

4. The electronic device of claim 3, wherein the antenna panel in the set of antenna panels is selected based on wireless performance metrics associated with the set of antenna panels.

5. The electronic device of claim 4, wherein the wireless performance metrics comprise a wireless performance metric selected from the group consisting of: signal-to-noise ratio (SNR), reference signal received power (RSRP), and pathloss.

6. The electronic device of claim 1, wherein the set of antenna panels is configured to transmit and receive the radar signals within a set of signal beams, the one or more processors being further configured to:
transmit the wireless data over a signal beam in the set of signal beams that is selected based on the identified position of the object.

7. The electronic device of claim 6, wherein the one or more processors is further configured to:
generate additional projected RFE values for the set of signal beams based on the transmitted and received radar signals, wherein the signal beam in the set of signal beams is selected based on the additional projected RFE values.

8. The electronic device of claim 1, wherein the one or more processors is further configured to:
map the object to a spatial zone based on the transmitted and received radar signals; and
select the projected RFE values, based on the spatial zone, from a look-up table of pre-calibrated RFE values stored on the electronic device.

9. The electronic device of claim 1, wherein the set of antenna panels comprises a first antenna panel having a first set of antennas disposed on a first substrate and having a first field of view and comprises a second antenna panel having a second set of antennas disposed on a second substrate and having a second field of view that is non-overlapping with the first field of view.

10. The electronic device of claim 1, the one or more processors being further configured to:
generate the projected RFE values based on the identified position of the object and based on a look-up table of pre-calibrated RFE values that are associated with different respective spatial zones relative to the electronic device.

11. An electronic device comprising:
antennas at different locations and configured to transmit and receive radar signals within a set of signal beams; and
one or more processors configured to
identify a position of an object relative to the antennas based on the transmitted and received radar signals,
transmit wireless data over a signal beam in the set of signal beams that is selected based on the identified position of the object, and
generate different respective projected radio-frequency exposure (RFE) values for each of the antennas based on the identified position, the signal beam in the set of signal beams being configured to transmit a report to a wireless base station that includes the different respective projected RFE values for each of the antennas.

12. The electronic device of claim 11, wherein the one or more processors is configured to identify the position using at least a first spatial coordinate and a second spatial coordinate, the signal beam in the set of signal beams being selected based on the first spatial coordinate and the second spatial coordinate.

13. The electronic device of claim 11, wherein the one or more processors is further configured to:
generate transmit power limits for the set of signal beams based on the projected RFE values, wherein the signal beam in the set of signal beams is selected based on the transmit power limits and wherein the report further comprises the generated transmit power limits.

14. The electronic device of claim 13, wherein the one or more processors is further configured to:
generate transmit power backoffs for the set of signal beams based on the projected RFE values, wherein the signal beam in the set of signal beams is selected based on the transmit power backoffs and wherein the report further comprises the generated transmit power backoffs.

15. The electronic device of claim 14, wherein the signal beam in the set of signal beams is selected based on wireless performance metrics associated with the antennas, the wireless performance metrics comprising signal-to-noise ratio (SNR), reference signal received power (RSRP), or pathloss.

16. The electronic device of claim 11, the one or more processors being further configured to:
map the signal beams into a set of spatial zones, each spatial zone being defined by a respective angular range and a respective distance range, wherein the different respective projected RFE values included in the report comprise a different respective projected RFE value for each of the spatial zones.

17. A method of operating an electronic device to communicate with a wireless base station, the method comprising:
with a set of antenna panels, transmitting radio-frequency signals within a set of signal beams;
with one or more processors, generating radio-frequency exposure (RFE) information based on the transmitted radio-frequency signals; and
with an antenna panel in the set of antenna panels, transmitting a report to the wireless base station using a signal beam of the set of signal beams, the report including the RFE information generated by the one or more processors, wherein the RFE information in the report comprises respective projected future RFE values for the antenna panels in the set of antenna panels.

18. The method of claim 17, wherein the RFE information further comprises information selected from the group consisting of: per-signal beam projected RFE values, per-antenna panel transmit power limit values, per-signal beam transmit power limit values, and per-signal beam transmit power backoff values.

19. The method of claim 17, wherein transmitting the report comprises transmitting the report using uplink control information (UCI) or a media access control (MAC) control element (CE).

20. The method of claim 17, wherein the projected future RFE values comprise power density values (PD) measured relative to a regulatory limit.

* * * * *